(12) United States Patent
Schlarb et al.

(10) Patent No.: US 9,106,044 B2
(45) Date of Patent: Aug. 11, 2015

(54) SYSTEM AND METHOD FOR GENERATING A SYNCHRONISATION CONTROL SIGNAL

(75) Inventors: Holger Schlarb, Hamburg (DE); Thorsten Lamb, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 531 days.

(21) Appl. No.: 13/588,463

(22) Filed: Aug. 17, 2012

(65) Prior Publication Data

US 2013/0044975 A1 Feb. 21, 2013

(30) Foreign Application Priority Data

Aug. 19, 2011 (DE) .......................... 10 2011 111 114

(51) Int. Cl.
| | |
|---|---|
| *H01S 3/00* | (2006.01) |
| *H05H 7/02* | (2006.01) |
| *H04J 14/02* | (2006.01) |
| *H04B 10/079* | (2013.01) |
| *G02B 6/293* | (2006.01) |
| *H04B 10/00* | (2013.01) |
| *H04L 7/00* | (2006.01) |

(52) U.S. Cl.
CPC ................ *H01S 3/0014* (2013.01); *H05H 7/02* (2013.01); *G02B 6/2938* (2013.01); *G02B 6/29395* (2013.01); *H01S 3/0085* (2013.01); *H04B 10/00* (2013.01); *H04B 10/07955* (2013.01); *H04J 14/02* (2013.01); *H04L 7/0075* (2013.01); *H05H 2007/022* (2013.01)

(58) Field of Classification Search
CPC ................ H01S 3/0014; H01S 3/0085; H05H 2007/022; H05H 7/02; G02B 6/2938; G02B 6/29395; H04L 7/0075; H04J 14/02; H04B 10/00; H04B 10/032; H04B 10/07955; H04B 10/299; H04B 7/033; H04B 10/25137; H04B 10/2507; H04B 10/25133
See application file for complete search history.

(56) References Cited

U.S. PATENT DOCUMENTS

| | | | | |
|---|---|---|---|---|
| 4,720,828 | A | * | 1/1988 | Jones ............................ 370/438 |
| 7,085,498 | B2 | * | 8/2006 | Lee et al. ...................... 398/155 |
| 7,224,906 | B2 | * | 5/2007 | Cho et al. ...................... 398/183 |
| 2004/0013353 | A1 | * | 1/2004 | Lee et al. ........................ 385/24 |
| 2004/0208649 | A1 | * | 10/2004 | Matthews et al. ............. 398/195 |
| 2006/0263098 | A1 | * | 11/2006 | Akiyama et al. .............. 398/188 |
| 2007/0212075 | A1 | | 9/2007 | Yin |
| 2010/0098408 | A1 | * | 4/2010 | Lohl et al. ....................... 398/16 |
| 2013/0188661 | A1 | * | 7/2013 | Wilk et al. ...................... 372/25 |

FOREIGN PATENT DOCUMENTS

| | | |
|---|---|---|
| DE | 60310820 T2 | 4/2007 |
| DE | 102008045359 B3 | 5/2010 |
| WO | 0169819 A1 | 9/2001 |

* cited by examiner

*Primary Examiner* — Akm Enayet Ullah
(74) *Attorney, Agent, or Firm* — Harness, Dickey & Pierce, P.L.C.

(57) ABSTRACT

A system for generating a synchronization control signal for synchronizing a radio-frequency signal having a frequency and a pulsed optical signal, the system comprising an electro-optical amplitude modulator that includes a phase shift controller having a controller output at which the synchronization control signal is output, a phase shift mixer that includes a first and a second photodetector, an optical input connection that connects the input for the optical signal to the optical input of the electro-optical amplitude modulator, and an input splitter that is arranged in the input connection in order to output the optical signal additionally at a branch of the input splitter.

8 Claims, 9 Drawing Sheets

\# SYSTEM AND METHOD FOR GENERATING A SYNCHRONISATION CONTROL SIGNAL

BACKGROUND

It is especially in accelerator plants which operate with pulsed beams and a multiplicity of elements for beam guidance and experimenting stations must be controlled synchronously with the pulsed beam of the accelerator that it is required to synchronize radio-frequency signals which are used in the individual experimenting stations with an optical reference, namely a pulsed laser beam. This laser beam can be preferably an erbium laser which emits pulses at a repetition rate of 216.6 MHz, wherein this repetition rate can be adjusted extremely accurately.

It is then required for the individual elements of the accelerator plant that the radio-frequency signals used therein are synchronized precisely with the pulses of the laser which means that, for example, a zero transition of the radio-frequency signal coincides accurately with a laser pulse.

In addition, it is also of interest in other fields to synchronize optical and electrical signals with one another.

SUMMARY

The present invention relates to a system for generating a synchronization control signal for synchronizing a radio-frequency signal having a frequency $f_{Rf}$ and a pulsed optical signal. Furthermore, the present invention relates to a radio-frequency synchronization device, an optical synchronization device and methods for generating a synchronization signal for synchronizing a radio-frequency oscillator and for synchronizing a pulsed optical signal with a radio-frequency signal.

It is the object of the present invention, therefore, to provide a system and a method for generating a synchronization control signal for synchronizing a radio-frequency signal and an optical signal, which allows extremely accurate adjustment and is also stable over very long periods.

This object is achieved by a system for generating a synchronization control signal for synchronizing a radio-frequency signal having a frequency $f_{Rf}$ and a pulsed optical signal, with a radio-frequency signal input for the radio-frequency signal, with an input for the optical signal pulsed at a repetition rate $f_R$, with an electro-optical amplitude modulator which has an optical input, a voltage input which is connected to the phase element of the amplitude modulator, and an optical output, with a phase shift controller which has a controller input and a controller output at which the synchronization control signal is output, with a phase shift mixer which has a radio-frequency input, a local-oscillator input and an output, with a first and a second photodetector which have an optical input and an output, with an optical input connection which connects the input for the optical signal to the optical input of the electro-optical amplitude modulator, and with an input splitter which is arranged in the input connection in order to output the optical signal additionally to a branch of the input splitter, wherein the radio-frequency signal input is connected to the voltage input of the electro-optical amplitude modulator, wherein the branch of the input splitter is connected to the optical input of the first photodetector, wherein the output of the first photodetector is connected to the local-oscillator input of the phase shift mixer, wherein the optical output of the electro-optical amplitude modulator is connected to the optical input of the second photodetector, wherein the output of the second photodetector is connected to the radio-frequency input of the phase shift mixer and wherein the output of the phase shift mixer is connected to the controller input of the phase shift controller.

The electro-optical amplitude modulator is preferably designed as Mach-Zehnder modulator which has two optical paths, wherein a phase element, in which an optical signal passing through it is changed in its phase angle in the case of an electrical voltage applied to it, is provided in one path. Thereafter, the signal passing through the phase element is recombined with the signal passing through the other path which, with a changed phase angle, results in an amplitude modulation of the overall signal in comparison with the input signal.

The "mixers" used in the present invention, that is to say the phase shift mixer, the bias mixer and the waveplate mixer are preferably conventional radio-frequency mixers which have a local-oscillator input, a radio-frequency input and output and are used for generating the respective error signal at the output.

The system according to the invention then enables a synchronization control signal to be output at the controller output of the phase shift controller, which control signal can either be used for controlling the phase angle of a radio-frequency source or the phase angle of the optical reference signal. In this context, controlling of the phase angle can also be carried out in such a manner that the frequency of the respective source is increased or lowered for a short time. In this arrangement, the system according to the invention operates as follows.

The pulsed optical signal is coupled into the electro-optical amplitude modulator and when a pulse of the optical signal does not coincide with a zero transition of the radio-frequency signal, the amplitude of the optical output signal is modulated at the optical output, i.e. lowered or raised in dependence on the value of the radio-frequency signal at the time of the optical pulse. This modulated optical output signal is converted into an electrical output signal with the aid of the second photodetector, with this output signal being supplied to the radio-frequency input of the phase shift mixer. At the same time, the phase shift mixer is supplied via its local-oscillator input with a radio-frequency signal, generated from the optical signal with the aid of the first photodetector, or an electrical input signal, respectively, so that after the phase shift mixer, a direct-voltage signal is present, the amplitude of which is proportional to the amplitude of the beat oscillation which is generated by the modulation of the pulses of the optical signal in the electro-optical amplitude modulator and which is converted into an electrical output signal at the second photodetector. This direct-voltage signal is fed into the phase shift controller, the output of which then generates the control signal which can be used either for the radio-frequency source or the source for the optical signal for controlling the respective phase angle.

Thus, according to the invention, the general procedure for generating a synchronization control signal is such that the optical signal is fed into the optical input of an electro-optical amplitude modulator, the radio-frequency signal being fed into its voltage input, the optical output signal output at the optical output being converted into an electrical output signal, wherein from the electrical output signal, a direct-voltage signal is generated, the amplitude of which corresponds to the amplitude of a beat oscillation impressed onto the optical output signal, and wherein the direct-voltage signal is supplied to a controller input of a phase shift controller which outputs the synchronization control signal. In particular, a part of the optical signal is split off before the input of the electro-optical amplitude modulator and converted into an electrical input signal, the electrical input signal and the electrical output signal being mixed in such a manner that the direct-voltage signal, which is supplied to the controller input of a phase shift controller, is generated.

This provides a system having a simple structure, which reliably detects the phase angle of the radio-frequency signal relative to the pulses of the optical signal and provides a corresponding control signal.

If the frequency of the radio-frequency signal $f_{Rf}$ is a half-integral multiple of the repetition rate $f_R$ at which the pulses of the pulsed optical signal are emitted, the first photodetector is followed by a frequency divider and between the second photodetector and the radio-frequency input of the phase mixer, a bandpass filter is provided, the center frequency of which is $f_R/2$.

The electrical input signal is thus halved in terms of frequency compared with the repetition rate $f_R$, the electrical output signal being bandpass filtered with a center frequency of half the repetition rate.

This ensures that radio-frequency signals having the same frequency are made to interact in the phase shift mixer.

In a preferred exemplary embodiment of the invention, the system is provided with a first power divider which has an input, a first output and a second output, and with a bias voltage controller which has a controller input and a controller output, wherein the output of the second photodetector is connected to the input of the first power divider, wherein the first output of the first power divider is connected to the radio-frequency input of the phase shift mixer, wherein the second output of the first power divider is connected to the controller input of the bias voltage controller and wherein the controller output of the bias voltage controller is connected to the bias voltage input of the electro-optical amplitude modulator.

In such an embodiment, the radio-frequency signal generated by the second photoelectrode from the optical output signal modulated in the electro-optical amplitude modulator, or the electrical output signal, respectively, is preferably supplied via a low-pass filter to a bias voltage controller so that the latter can correct the bias voltage at the amplitude modulator in such a manner that in the case where the optical signal is not modulated, that is to say the phase angle between the optical signal and radio-frequency signal is correct, the signal output by the modulator has the desired level. Generally, the electrical output signal is thus low-pass filtered and supplied to the bias voltage input.

In a further preferred exemplary embodiment, the system according to the invention is provided with a beam divider which has an input, a first output and a second output, comprising a beam combiner which has a first input, a second input and an output, and with an optical delay section, wherein the beam divider follows the input splitter in the input connection, wherein the first output of the beam divider is connected to the first input of the beam combiner which follows the beam divider in the input connection, and wherein the optical delay section connects the second output of the beam divider to the second input of the beam combiner.

With the aid of the beam divider it is then possible, if the radio-frequency signal which is to be synchronized with the optical signal having a repetition rate $f_R$ has a frequency $f_{Rf}$ which is an even-numbered multiple of the repetition rate $f_R$, that is to say $f_{RF}=2n \cdot f_R$, to generate by means of the delay section a further pulse which is spaced apart from the actual pulse of the optical signal by one quarter of the oscillation period. In this way, it is then possible to synchronize also radio-frequency signals, the frequencies of which have the aforementioned relationship to the repetition rate.

In this case, however, it is necessary that the first photodetector is followed by a bandpass filter, the center frequency of which is twice the repetition rate of the optical signal, that is to say $2f_R$.

Thus, the electrical input signal and electrical output signal are bandpass filtered with a center frequency amounting to twice the repetition rate $f_R$, wherein a part of the optical signal is split off before the input of the electro-optical amplitude modulator and delayed in such a manner that the delay amounts to one quarter of the distance between two pulses of the optical signal, and wherein the optical signal and the delayed part are fed into the input.

As an alternative, it is also possible, in the case where the frequency $f_{Rf}$ of the radio-frequency signal is an odd-numbered multiple of the repetition rate $f_R$ of the optical signal, that is to say $f_{RF}=(2n+1) \cdot f_R$, to generate by means of the first delay section an additional pulse which is spaced apart from the input pulse by half the oscillation period. However, it is then necessary that a bandpass filter following the first photodetector has a center frequency of $f_R$.

In this case, the electrical input signal and the electrical output signal are bandpass-filtered with a center frequency corresponding to the repetition rate $f_R$ and a part of the optical signal is split off before the input of the electro-optical amplitude modulator and delayed in such a manner that the delay is half the distance between two pulses of the optical signal. Finally, the optical signal and the delayed part are fed into the input.

In both cases, the first delay section enables successive optical pulses always to sample zero transitions of the radio-frequency signal with alternately positive and negative slope.

Finally, a system according to the invention according to a further preferred exemplary embodiment can be constructed with a first waveplate for rotating the plane of polarization of the optical signal incident on the first waveplate, wherein the first waveplate is arranged between the input splitter and the beam divider and the beam divider is designed as polarizing beam divider, wherein the first waveplate has an adjusting device with a control signal input for the controlled adjustment of the angle of rotation of the polarization, wherein the electro-optical amplitude modulator has an inverted optical output, the output signal of which, with an incoming optical signal at the optical input of the amplitude modulator is changed by the same amount but with reversed sign compared with the incoming signal as the output signal at the optical output of the amplitude modulator, with an optical coupler having a first input, a second input and an output, wherein the output of the optical coupler is connected to the optical input of the second photodetector, wherein the optical output of the amplitude modulator is connected to the first input of the optical coupler, wherein the inverted optical output of the amplitude modulator is connected to the second input of the coupler via a second optical delay section, with a waveplate mixer which has a radio-frequency input, a local-oscillator input and an output, with a waveplate controller which has a controller input and a controller output which is connected to the control signal input of the adjusting device of the first waveplate, with a bias voltage mixer which has a radio-frequency input, a local-oscillator input and an output, wherein the output of the first photodetector is connected to the local-oscillator input of the bias voltage mixer and to the local-oscillator input of the waveplate mixer, wherein the output of the second photodetector is connected to the radio-frequency input of the bias voltage mixer, wherein the output of the bias voltage mixer is connected to the controller input of the bias voltage controller, wherein the output of the second photodetector is connected to the radio-frequency input of the waveplate mixer and wherein the output of the waveplate mixer is connected to the controller input of the waveplate controller.

If the delay sections are suitably adjusted, this structure enables a synchronization error, that is to say a displacement of the zero transitions of the radio-frequency signal with respect to the optical pulses, a bias voltage adjusted faultily at the electro-optical amplitude modulator and a first waveplate adjusted faultily in each case to effect a beat oscillation which is detected in the second photodetector, but the phase shift and/or frequency of which in each case being different. It is thus possible to discriminate between these different causes and, as described before, control circuits can be constructed which separately correct the faulty adjustments.

If thus the local-oscillator inputs of the waveplate mixer and of the bias voltage mixer have preceding phase shifters and bandpass filters which are suitably adjusted, either the bias voltage or the adjustment of the first waveplate or the phase shift between optical signal and radio-frequency signal can be controlled due to the different phase angle and frequency. In addition, the variation of the signals with time is utilized here so that the respective beat oscillation is sampled at a defined phase angle within the period in which the in each case other beat oscillation has a zero transition so that, independently of the amplitude of the other oscillations, only the amplitude is detected the magnitude of which is a measure of the maladjustment of the bias voltage, of the waveplate or of the phase angle, respectively. The third signal can be differentiated from the other ones in each case on the basis of the deviating frequency.

Thus, the procedure is preferably adopted that a part of the optical signal is split off before the input of the electro-optical amplitude modulator and delayed and the optical signal and the delayed part are fed into the input, wherein the inverted optical output signal is delayed with respect to the optical output signal and, before being converted into an electrical output signal, is combined with the optical output signal, wherein the electrical input signal and the electrical output signal are mixed in such a manner that a direct-voltage signal is generated which is controlled by controlling the bias voltage for the bias voltage input.

In particular, the amplitude of the part of the optical signal which is split off and delayed before the input of the electro-optical amplitude modulator can be controlled, and the electrical input signal and the electrical output signal are mixed in such a manner that a direct-voltage signal is generated which is controlled by controlling the amplitude of the split-off part of the optical signal.

Thus, the electrical input signal and the electrical output signal having a center frequency corresponding to the repetition rate $f_R$ are preferably bandpass-filtered and mixed for generating the direct-voltage signal which is controlled by controlling the bias voltage for the bias voltage input, wherein the electrical input signal and the electrical output signal are bandpass filtered with a center frequency amounting to twice the repetition rate $f_R$, and mixed for generating the direct-voltage signal which is controlled by controlling the amplitude of the split-off part of the optical signal, wherein the split-off part arrives at the input delayed by a quarter of the temporal distance between two pulses of the optical signal, compared with the optical signal, and wherein the inverted optical output signal is delayed with respect to the optical output signal in such a manner that the delay of the inverted optical output signal is one half of the temporal distance between two pulses of the optical signal.

Accordingly, as an alternative, the electrical input signal and the electrical output signal can also be bandpass-filtered with a center frequency amounting to twice the repetition rate $f_R$, and mixed for generating the direct-voltage signal which is controlled by controlling the bias voltage for the bias voltage input, wherein the electrical input signal and the electrical output signal are bandpass-filtered with a center frequency corresponding to the repetition rate $f_R$ and mixed for generating the direct-voltage signal which is controlled by controlling the amplitude of the split-off part of the optical signal, wherein the split-off part arrives at the input delayed by one half of the temporal distance between two pulses of the optical signal and wherein the inverted optical output signal is delayed with respect to the optical output signal in such a manner that the delay of the inverted optical output signal is one quarter of the temporal distance between two pulses of the optical signal.

Finally, the object mentioned initially is also achieved by a method as claimed in claim 11, preferred embodiments of this method being described in claims 12 to 22. The advantages achieved by means of the method according to the invention and the preferred embodiments thereof have already been explained in conjunction with the system according to the invention.

DRAWINGS

In the text which follows, the present invention is explained with reference to a drawing which only shows preferred exemplary embodiments, wherein.

DETAILED DESCRIPTION

Figure 1:
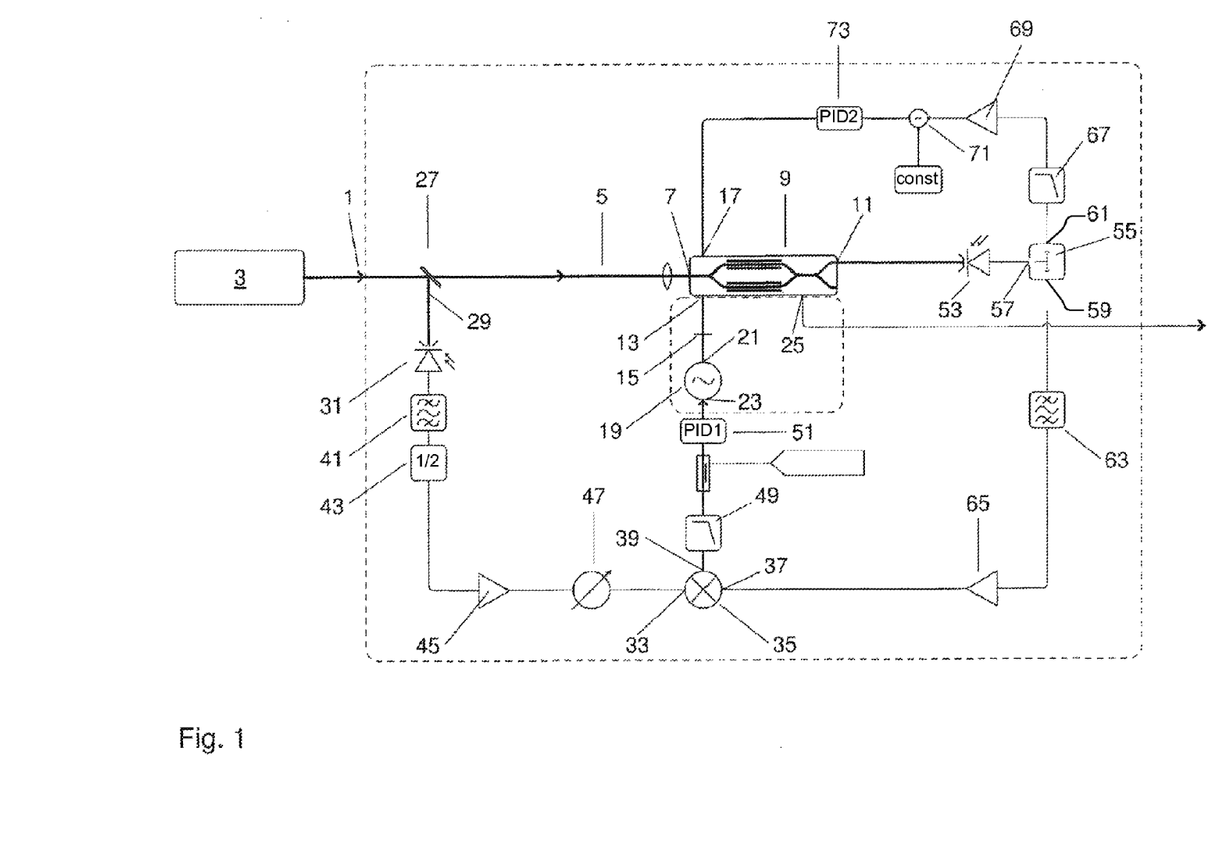
FIG. 1 shows a circuit diagram of a radio-frequency synchronization device according to a first exemplary embodiment of the present invention.

FIG. 1 shows a diagrammatic circuit diagram of a radio-frequency synchronization device, a system for generating a synchronization signal being integrated in this device or, respectively, a corresponding method is executed as will be found in the description following. In addition, a method for synchronizing a radio-frequency oscillator by means of a pulsed optical signal is executed by this means.

The radio-frequency synchronization device according to the first exemplary embodiment has an input 1 for the optical signal pulsed at a repetition rate $f_R$ which is generated in a reference source 3, this being preferably an erbium-doped fiber laser. The reference source 3 is connected to the input 1 from which, in turn, an optical input connection 5 extends, the end of which remote from the input 1 is connected to the optical input 7 of an electro-optical amplitude modulator 9 which is preferably constructed as Mach-Zehnder modulator.

An electro-optical amplitude modulator 9 in the sense of the present invention is understood to be an electro-optical component in which an incoming optical pulse is amplitude-modulated when a voltage is present at the phase element of the modulator at the time of impingement of the optical pulse on the modulator 9, so that the pulse is output at the optical output 11 of the modulator 9 and delayed in time but with modulated amplitude.

For this purpose, the electro-optical amplitude modulator 9 in the sense of the present invention has a voltage input 13 which is connected to the radio-frequency signal input 15 of the system for generating a synchronization control signal. The voltage input 13, in turn, is connected to the phase element in the interior of the electro-optical amplitude modulator 9. In addition, the amplitude modulator 9 has a bias voltage input 17, connected to the voltage input 13, to which a direct voltage can be applied so that a modulation, which is independent of the voltage present at the voltage input 13, of the incoming optical signal can be achieved. Thus, the amplitude of the unmodulated signal output at the optical output 11 can be adjusted via the bias voltage input 17.

In addition, the radio-frequency synchronization device has a radio-frequency oscillator 19 which comprises a radio-frequency output 21 which, in turn, is connected to the radio-frequency signal input 15. In addition, the radio-frequency oscillator 19 has a control input 23 at which the frequency of the radio-frequency signal output by the oscillator 19 can be predetermined by a direct-voltage signal, which allows an adaptation of the phase angle by raising or lowering the frequency for a short time. Finally, an output 25 at which the radio-frequency signal coupled in at the voltage input 13 is output again unchanged is provided in the electro-optical amplitude modulator 9.

In the optical input connection 5, an input splitter 27 is provided which, on the one hand, forwards the incident pulsed optical signal along the optical input connection 5 and, on the other hand, outputs a part of the pulsed signal at a branch 29. The branch 29 is connected to the optical input of a first photodetector 31 which converts the pulsed optical signal into an electrical signal having the frequency $f_R$ and outputs it at its output. Thus, a part of the optical signal is split off before the input 7 and converted into an electrical input signal. The output of the first photodetector 31 is connected to the local-oscillator input 33 of a phase shift mixer 35 which, besides the local-oscillator input 33, has a radio-frequency input 37 and an output 39. The phase shift mixer 35 is a conventional mixer known from the field of analog electronics. Between the output of the first photodetector 31 and the local-oscillator input 33 of the phase shift mixer 35, a bandpass filter 41, a frequency divider 43, an amplifier 45 and a phase shifter 47 are provided one after the other so that the electrical input signal output by the first photodetector 31 is first filtered in the bandpass filter 41, the center frequency of which corresponds to the repetition rate $f_R$ of the reference source 3 and subsequently halved in frequency with the aid of the frequency divider 43. This signal is then amplified by means of the amplifier 45, if necessary influenced in its phase angle by means of the phase shifter 47 and fed into the local-oscillator input 33 of the phase shift mixer 35. The output 39 of the phase shift mixer 35 is connected to a low-pass filter 49, the output of which, in turn, is connected to the controller input of a phase shift controller 51. The controller output of the phase shift controller 51 is coupled to the control input 23 of the radio-frequency oscillator 19 so that the phase shift controller 51 can control the phase angle of the radio-frequency signal generated by the radio-frequency oscillator 19 via the frequency.

The optical output 11 of the electro-optical amplitude modulator 9 is connected to the optical input of a second photodetector 53 which converts the pulse signal, possibly modulated by the amplitude modulator 9, into an electrical output signal. The second photodetector 53 is followed by a first power divider 55 which has an input 57 and a first output 59 and a second output 61. The first output 59 is connected via a bandpass filter 63 and an amplifier 65 to the radio-frequency input 37 of the phase shift mixer 35, the center frequency of the bandpass filter 63 being one half of the repetition rate of the pulsed reference signal, that is to say $f_R/2$.

In this manner, two electrical signals, the frequency of which is in each case $f_R/2$, are mixed in the phase shift mixer 35 so that the signal output at the output 39 of the phase shift mixer 35 is proportional to the amplitude of the beat oscillation which is modulated onto the optical pulses in the electro-optical amplitude modulator 9.

The second output 61 of the first power divider 55 is connected via a low-pass filter 67, an amplifier 69 and a subtraction element 71 to a bias voltage controller 73, the controller output of which is connected to the bias voltage input 17 of the electro-optical amplitude modulator. By this means, it is possible that the signal output at the optical output 11 of the amplitude modulator 9 is first averaged with the aid of the low-pass filter 67 and then used for controlling the bias voltage so that the optical output signal output at the optical output 11 is as constant as possible.

Figure 3:
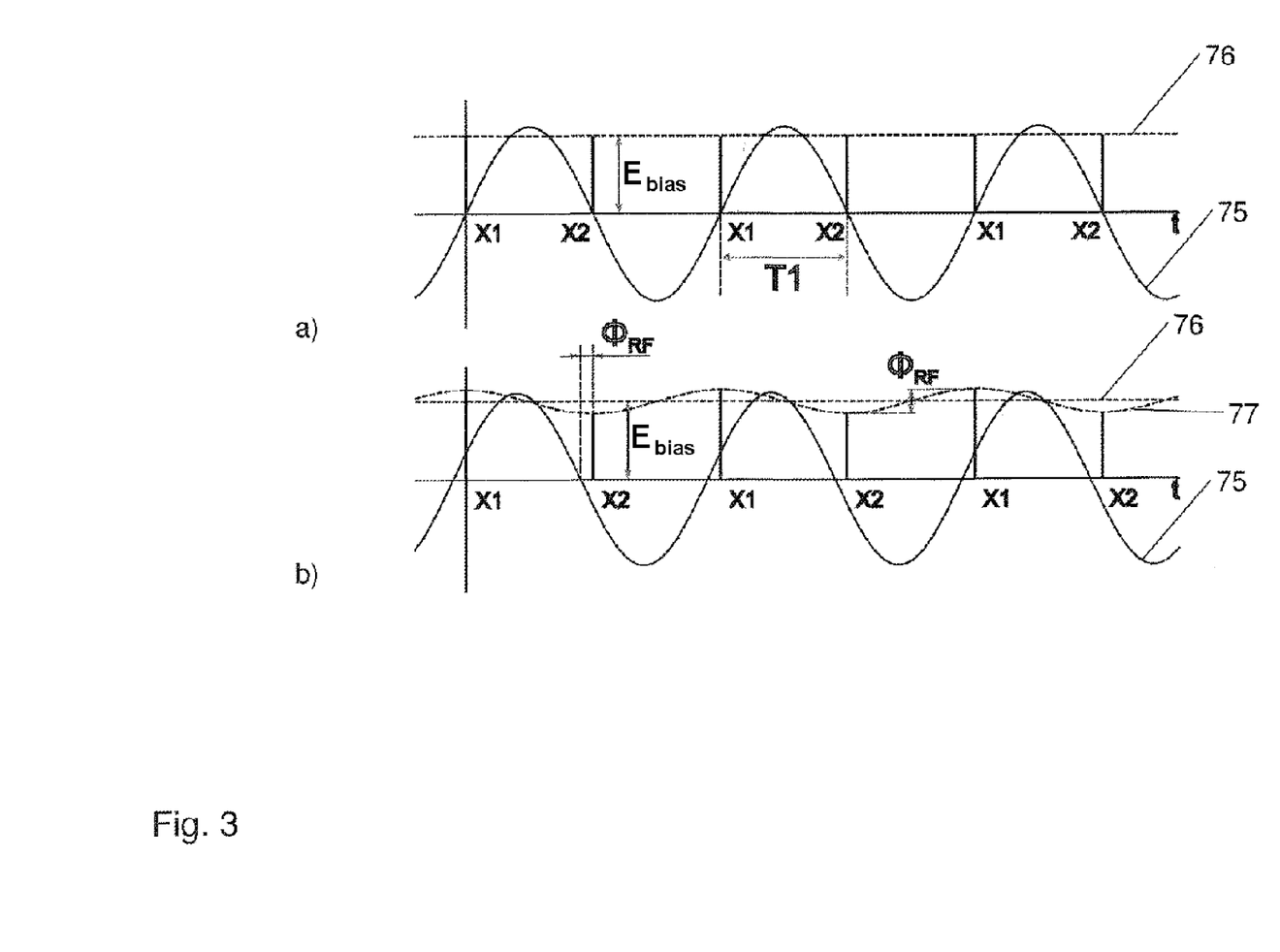
FIG. 3 shows representations of the variation of the optical signals with time at the second photodetector together with the variation of the radio-frequency signal with time.

The operation of the system shown in FIG. 1 can be seen in FIG. 3 where it is assumed that the frequency $f_{RF}$ of the radio-frequency oscillator 19 is a half-integer multiple of the repetition rate $f_R$ at which the optical pulses are emitted by the reference source 3, that is to say $f_{RF}=(n+\frac{1}{2})\cdot f_R$.

In the case shown in part A of FIG. 3 in which the radio-frequency signal 75 of the radio-frequency oscillator 19 is in-phase with pulses X1, X2 of the optical reference signal, zero transitions of the radio-frequency signal 75 always coincide with pulses X1, X2 in the electro-optical amplitude modulator 9 so that the amplitude of the optical pulses (X1, X2) is not modulated. Thus, only a constant signal 76 is generated at the second photodetector 53. Thus, the amplitude of the signal which leaves the low-pass filter 49 behind the phase shift mixer 35 is also zero and the phase angle of the radio-frequency signal generated by the radio-frequency oscillator 19 remains unchanged.

If, however, as is shown in part B of FIG. 3, the radio-frequency signal 75 is phase-shifted by the amount $\phi_{RF}$ with respect to the pulses X1, X2 of the optical reference signal, the pulses are amplitude-modulated and a beat oscillation 77 is generated, the frequency of which is $f_R/2$. This beat oscillation having the frequency $f_R/2$ is output as electrical output signal by the second photodetector 53 and thus supplied to the phase shift mixer 35 at the radio-frequency input 37. The signal leaving the low-pass filter 49 is thus proportional to the phase shift $\phi_{RF}$ and the controller input of the phase shift controller 51 receives a corresponding signal so that radio-frequency oscillator 19 is correspondingly controlled.

In this exemplary embodiment, described previously, the system for generating a synchronization control signal thus comprises the entire structure with the exception of the reference source 3 and the radio-frequency oscillator 19. In contrast to the radio-frequency synchronization device shown in FIG. 1, such a system can also be used for controlling, instead of a radio-frequency oscillator, the phase angle of the optical reference signal output by a reference source 3' as is shown in FIG. 2.

In deviation from the circuit diagram from FIG. 1, the following difference exists here. In the present case, the controller output of the phase shift controller 51 is not connected to a control input of a radio-frequency source but to a control input of the optical reference source 3'. In addition, the output signal of the radio-frequency source 19' is fed directly into the voltage input 13 of the electro-optical modulator 9, and in the optical input connection 5 a second splitter 79 follows the input splitter 27. The synchronized pulsed optical signal is then output at the branch 81 of the second splitter 79.

Figure 2:
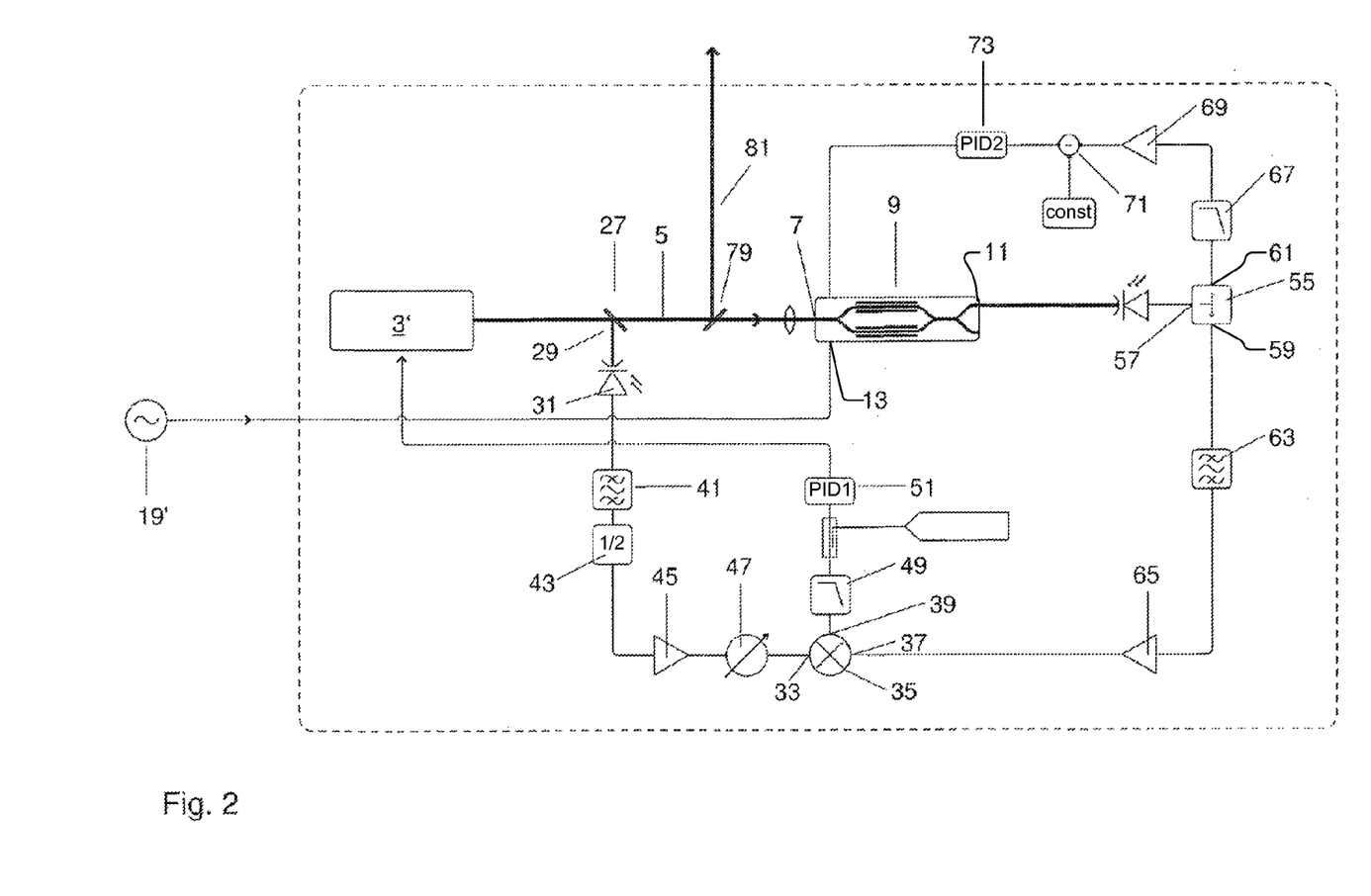
FIG. 2 shows a circuit diagram of an optical synchronization device according to an exemplary embodiment of the present invention.

Thus, in the synchronization device shown overall in FIG. 2, the phase angle of the pulsed signal output by the optical reference source 3' is controlled. But the operation is identical to that described in conjunction with FIG. 1.

Figure 4:
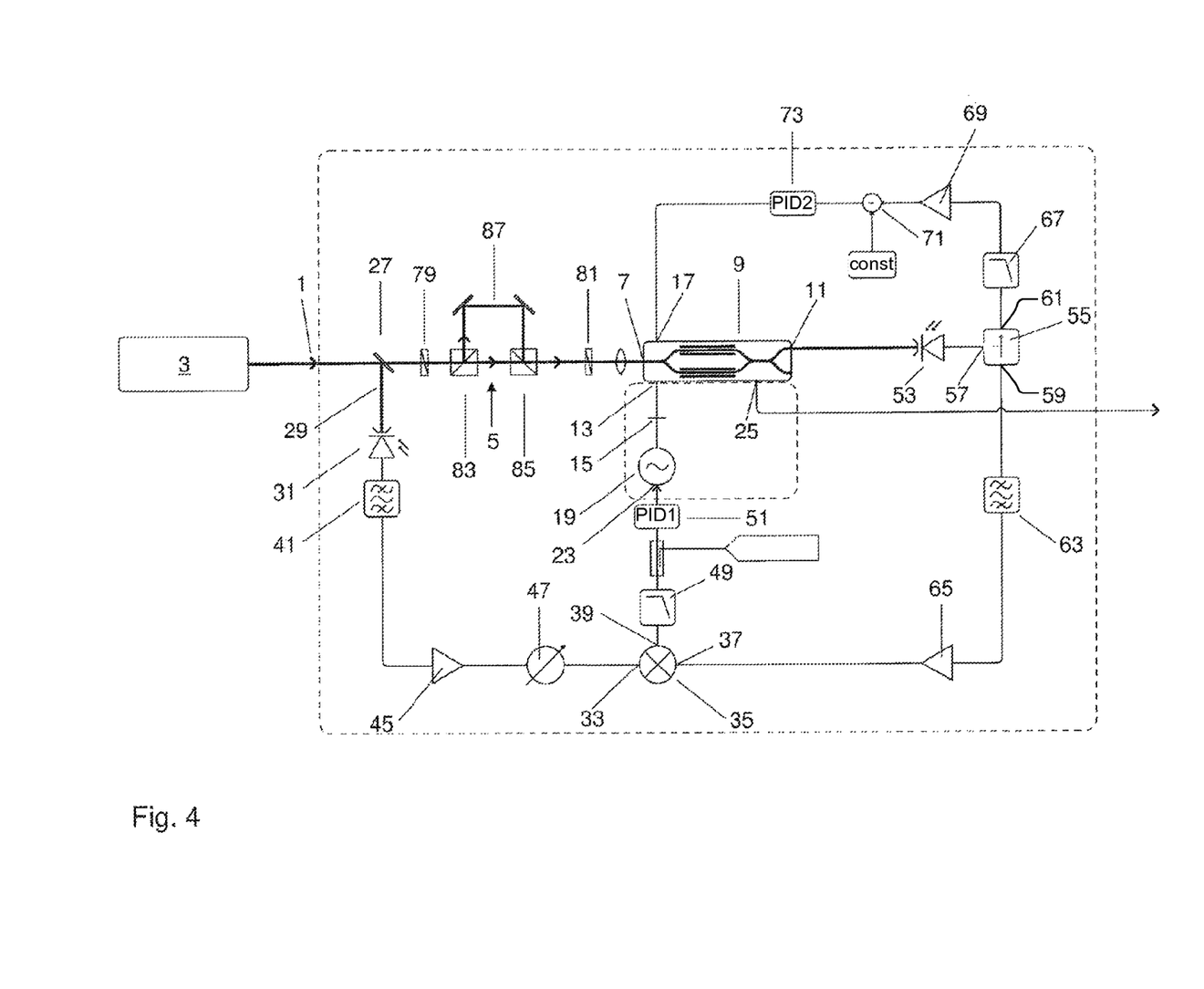
FIG. 4 shows a circuit diagram of a radio-frequency synchronization device according to a second exemplary embodiment of the present invention.

FIG. 4 shows the diagrammatic circuit diagram of the second exemplary embodiment of a radio-frequency synchronization device which differs from the first exemplary embodiment shown in FIG. 1, on the one hand, in that no frequency divider is arranged any longer in the connection between the output of the first photodetector 31 and the local-oscillator input 33 of the phase shift mixer 35. Besides that, a first waveplate 79 and a second waveplate 81 are provided in the optical input connection 5, between which waveplates a polarizing beam divider 83 and a polarizing beam combiner 85 are provided in series, a first output of the polarizing beam divider being connected directly to the first input of the beam combiner 85, whereas a second output of the beam divider 83 is connected to the beam combiner 85 via an optical delay section 87.

The length of the optical delay section 87 depends on whether the frequency $f_R$ of the radio-frequency signal generated by the radio-frequency oscillator 19 is an odd-numbered or even-numbered multiple of the repetition rate $f_R$ at which the optical pulses are emitted by the reference source 3.

If the frequency $f_{RF}$ of the radio-frequency signal is an odd-numbered multiple of the repetition rate $f_R$, that is to say $f_{RF}=(2n+1)\cdot f_R$, the length of the optical delay section 87 is dimensioned in such a manner that the split-off pulse generated in the beam divider 83, which passes through the optical delay section 87 arrives in the beam combiner 85 with a delay which corresponds to half the distance in time between two pulses emitted by the reference source 3. In this case, the ratio, shown in FIG. 3, between the radio-frequency signal 75, on the one hand, and the pulses X1, X2 which emerge from the electro-optical amplitude modulator 9 at the optical output 11 is obtained again, wherein X1 designates the undelayed pulse and X2 the one delayed by the delay section 87. Since in this case pulses X1, X2 arrive at twice the frequency of the reference source in the modulator 9, a beat oscillation 77 having the frequency $f_R$ is obtained if, as shown in part B of FIG. 3, a phase shift $\phi_{RF}$ is present. For this reason, the bandpass filters 41, 63 in the second exemplary embodiment are constructed in such a manner that the center frequency is $f_R$ so that corresponding signals are made to interact or mixed in the phase shift mixer 35, wherein here, too, the direct-voltage signal occurring at the output 39 of the phase shift mixer 35 or after the low-pass filter 49 is a measure of the amplitude of this beat oscillation, this amplitude again being directly proportional to the phase shift $\phi_{RF}$.

In the second exemplary embodiment, the optical delay section 87 thus enables, in this case, too, the successive optical pulses in each case to sample zero transitions with alternating slope.

In the case where the frequency $f_{RF}$ of the radio-frequency signal, which is generated by the radio-frequency oscillator 19, is an even-numbered multiple of the repetition rate $f_R$ of the reference source 3, that is to say $f_{RF}=2n\cdot f_R$, the optical delay section 87 is dimensioned in such a manner that the delay with which the pulse passing through the delay section 87 arrives at the beam combiner 85 is a quarter of the distance in time between two pulses. The result obtained at the second photodetector 53 is shown in FIG. 5, part A again showing the case where the radio-frequency signal 75 is in phase with the pulses X1, X2 which impinge on the input 7 of the electro-optical amplitude modulator 9. Part B shows the case where a phase shift is present which then leads to a beat oscillation 77, the frequency of which is $2f_R$ (in part B, this can be seen from the fact that two cycles of the beat oscillation 77 are located between two original pulses X1).

Figure 5:
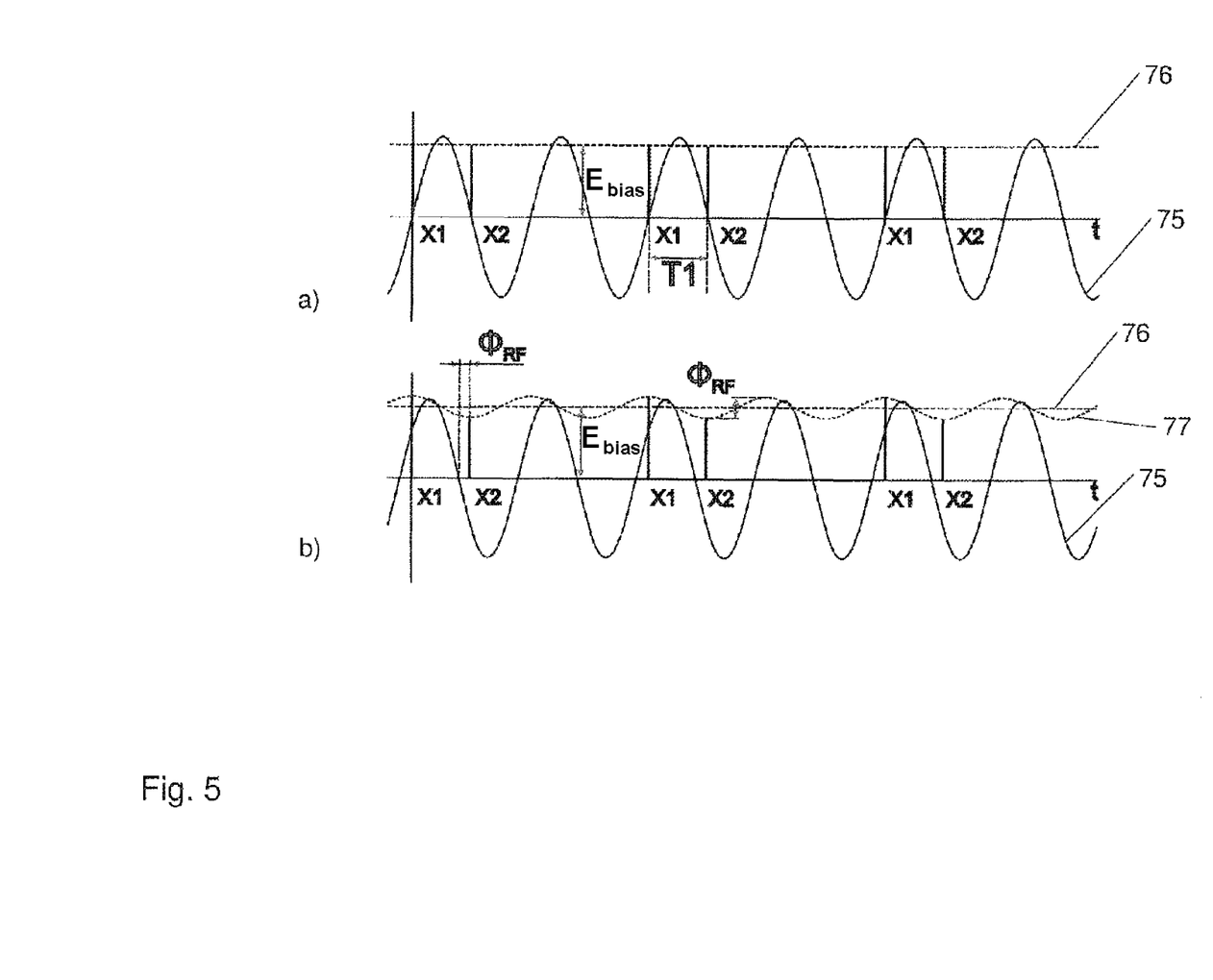
FIG. 5 shows representations of the variation of the optical signals with time at the second photodetector together with the variation of the radio-frequency signal with time in the second exemplary embodiment of a radio-frequency synchronization device.

If the radio-frequency signal has a frequency $f_{Rf}$ which is an even-numbered multiple of the repetition rate $f_R$, the bandpass filters 41, 63 are therefore selected in such a manner that the center frequency is $2f_R$. This will again result in a direct voltage which is proportional to the phase shift $\phi_{RF}$ at the controller input of the phase shift controller 51 so that the radio-frequency oscillator 19 can be controlled correspondingly by the phase shift controller 51.

Figure 6:
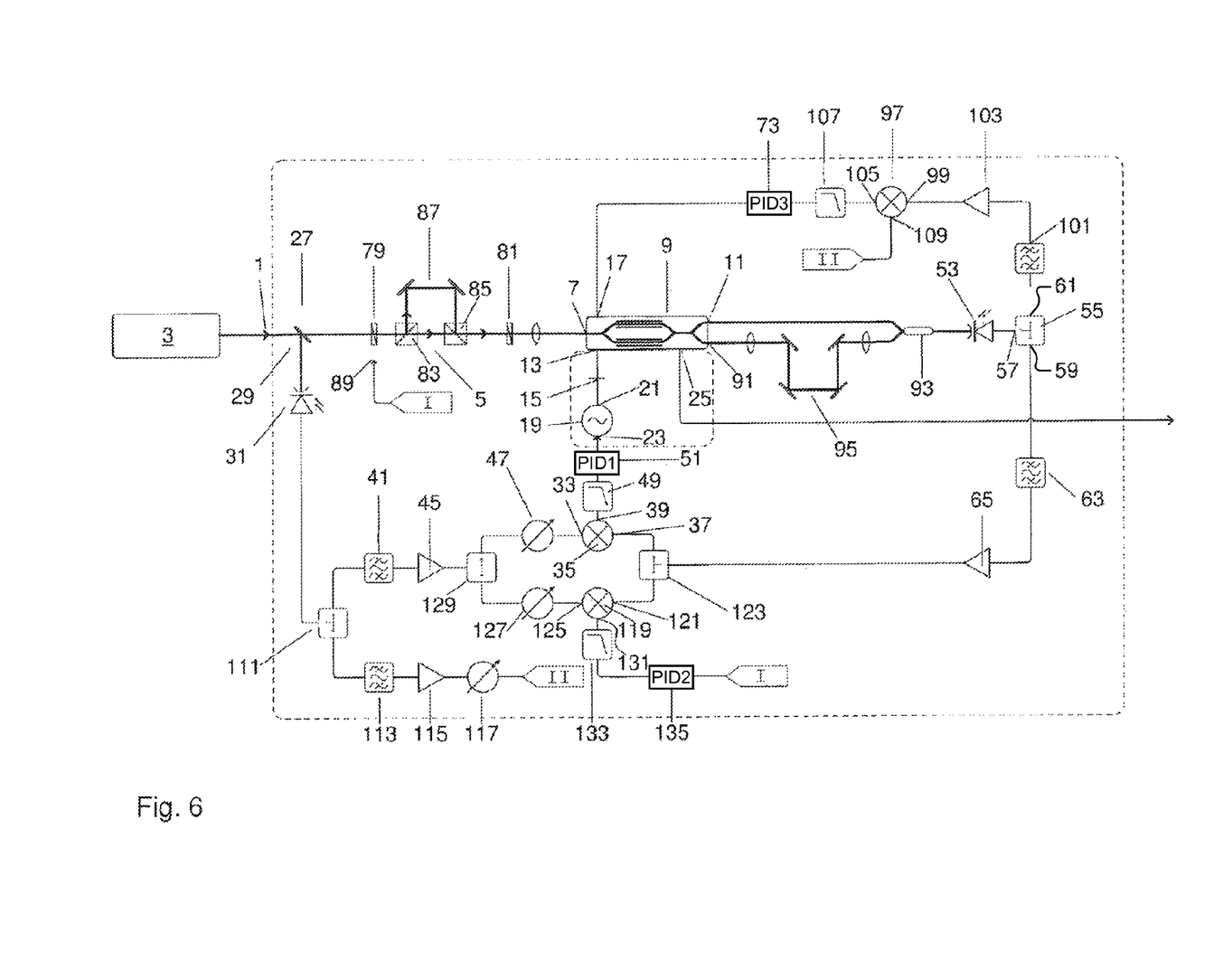
FIG. 6 shows a circuit diagram of a radio-frequency synchronization device according to a third exemplary embodiment of the present invention.

FIG. 6 shows a third exemplary embodiment of a radio-frequency synchronization device according to the invention, the latter differing from the exemplary embodiments previously described firstly in that the first waveplate 79 has an adjusting device for the controlled adjustment of the angle of rotation of the polarization, the adjusting device having a control signal input 89. Thus, the amplitude of the part of the optical signal which is split-off and delayed before the input 7 can be controlled.

In addition, an inverted optical output 91 is provided at the electro-optical amplitude modulator 9, the output signal of which output has been changed in an incoming optical signal at the optical input 7 of the amplitude modulator 9 with respect to the incoming signal by the same extent but with reversed sign as the output signal at the optical output 11. In addition, the optical input of the second photodetector 53 is preceded by an optical coupler 93, the optical output 11 being connected directly to the input of the coupler 93, whereas the inverted optical output 91 of the amplitude modulator 9 is connected to the coupler 93 via a second optical delay section 95.

Furthermore, a bias voltage mixer 97 is connected to the second output 61 of the first power divider, in such a manner that its radio-frequency input 99 is coupled to the second output 61 via a bandpass filter 101 and an amplifier 103. One output of the first power divider 55 is thus connected to the radio-frequency input 99 of the bias voltage mixer 97. The output 105 of the bias voltage mixer 97 is then in turn connected via a low-pass filter 107 to the bias voltage controller 73, the controller output of which is coupled to the bias voltage input 17. The local-oscillator input 109 of the bias voltage mixer 97 is connected to the optical output of the first photodetector 31 via a power divider 111, a bandpass filter 113, an amplifier 115 and a phase shifter 117.

Finally, a waveplate mixer 119 is provided, the radio-frequency input 121 of which is connected to the first output 59 of the first power divider 55 via a power divider 123, the amplifier 65 and the bandpass filter 63. The local-oscillator input 125 of the waveplate mixer 119 is connected to the optical output of the first photodetector 31 via a phase shifter 127, a power divider 129, the amplifier 45, the bandpass filter 41 and the power divider 111. The output 131 of the waveplate mixer 119, finally, is connected via a low pass filter 133 to a waveplate controller 135, the controller output of which is connected to the control signal input 89 of the adjusting device for the first waveplate 79.

Figure 7:
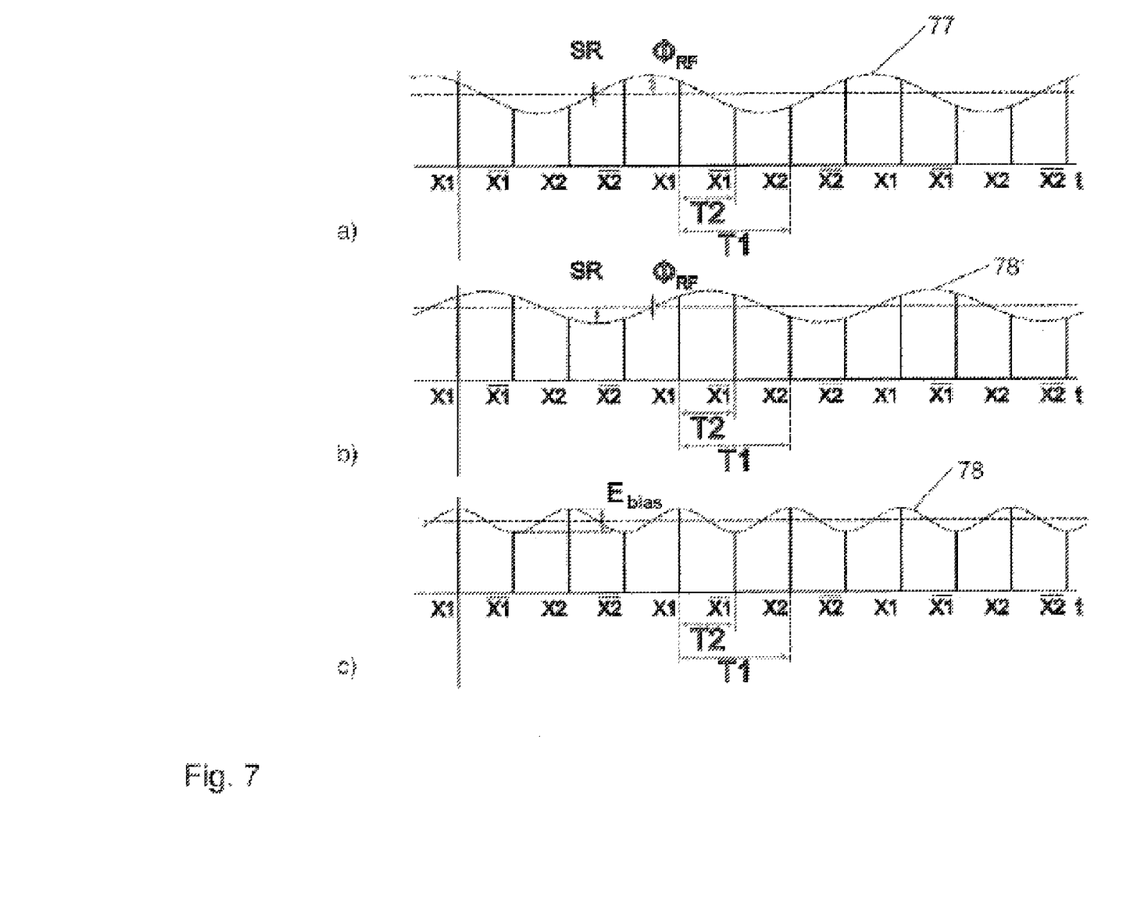
FIG. 7 shows representations of the variation of the optical signals with time at the second photodetector together with the variation of the radio-frequency signal with time in the third exemplary embodiment of a radio-frequency synchronization device.

This third exemplary embodiment, previously described with reference to FIG. 6, is provided for the case where the frequency $f_{Rf}$ of the radio-frequency signal is an odd-numbered multiple of the repetition rate $f_R$ of the reference source 3, that is to say $f_{RF}=(2n+1)\cdot f_R$. In this case, the length of the second optical delay section 95 between the inverted optical output 91 and the coupler 93 is dimensioned in such a manner that an optical pulse passing along this path is delayed by a quarter of the distance in time between two pulses of the reference source 3 compared with the pulse which passes between the optical output 11 and the coupler 93. At the optical input of the second photodetector 53, this results in three further pulses X2 per generated pulse X1 (due to the first optical delay section 87) and $\overline{X1}$ and $\overline{X2}$ (due to the second optical delay section 95) which arrive there, wherein, as shown in part A of FIG. 7, if a phase shift is present between pulsed reference signal and radio-frequency signal, a beat oscillation 77 having the frequency $f_R$ and a phase shift of −45° is obtained. Part B of FIG. 7 shows that an unequal division of the amplitude of the pulses which pass along the first optical delay section 87 and those which pass directly to the beam combiner 85, that is to say X1 and X2, lead to a beat oscillation 78' having a phase shift of +45° and a frequency of $f_R$. This means that, although the beat oscillations 77, 78' have the same frequency, they are phase shifted by 90° with respect to one another.

Finally, it can be seen in part C of FIG. 7 that in the case of a wrongly set bias voltage at the bias voltage input 17 of the electro-optical amplitude modulator 9, a beat oscillation 78 having a frequency of $2f_R$ is generated.

By sampling the beat oscillations 77, 78' at different phase angles, it is thus possible to measure either the extent of the phase shift $\phi_{RF}$ or the misalignment of the waveplates (SR), the one being measured in each case in the area of a zero transition of the other one so that both measurements can be made independently of one another. This makes use of the fact especially that the beat oscillations 77, 78' are phase shifted by 90° with respect to one another.

With regard to measuring a wrong bias voltage at which the associated beat oscillation 78 has the frequency $2f_R$, another bandpass filter must be used. The exemplary embodiment according to FIG. 6 is designed accordingly, the signals which lead to the local-oscillator input 109 or to the radio-frequency input 99 of the bias voltage mixer 97, respectively, being filtered in such a manner that these signals in each case arrive there with a frequency $2f_R$ and the direct-voltage signal behind the low-pass filter 107 is then a measure of the maladjustment of the bias voltage so that the bias voltage controller 73 can operate accordingly.

Analogously, an electrical input signal and an electrical output signal having the frequency $f_R$ are in each case supplied to the radio-frequency input 121 and the local-oscillator input 125 of the waveplate mixer 119, the phase shifters at the waveplate mixer 119 and also at the bias voltage mixer 97 being adjusted in such a manner that the respective beat oscillation 77, 78, 78' is sampled at the correct phase angle (see FIG. 7).

Figure 8:
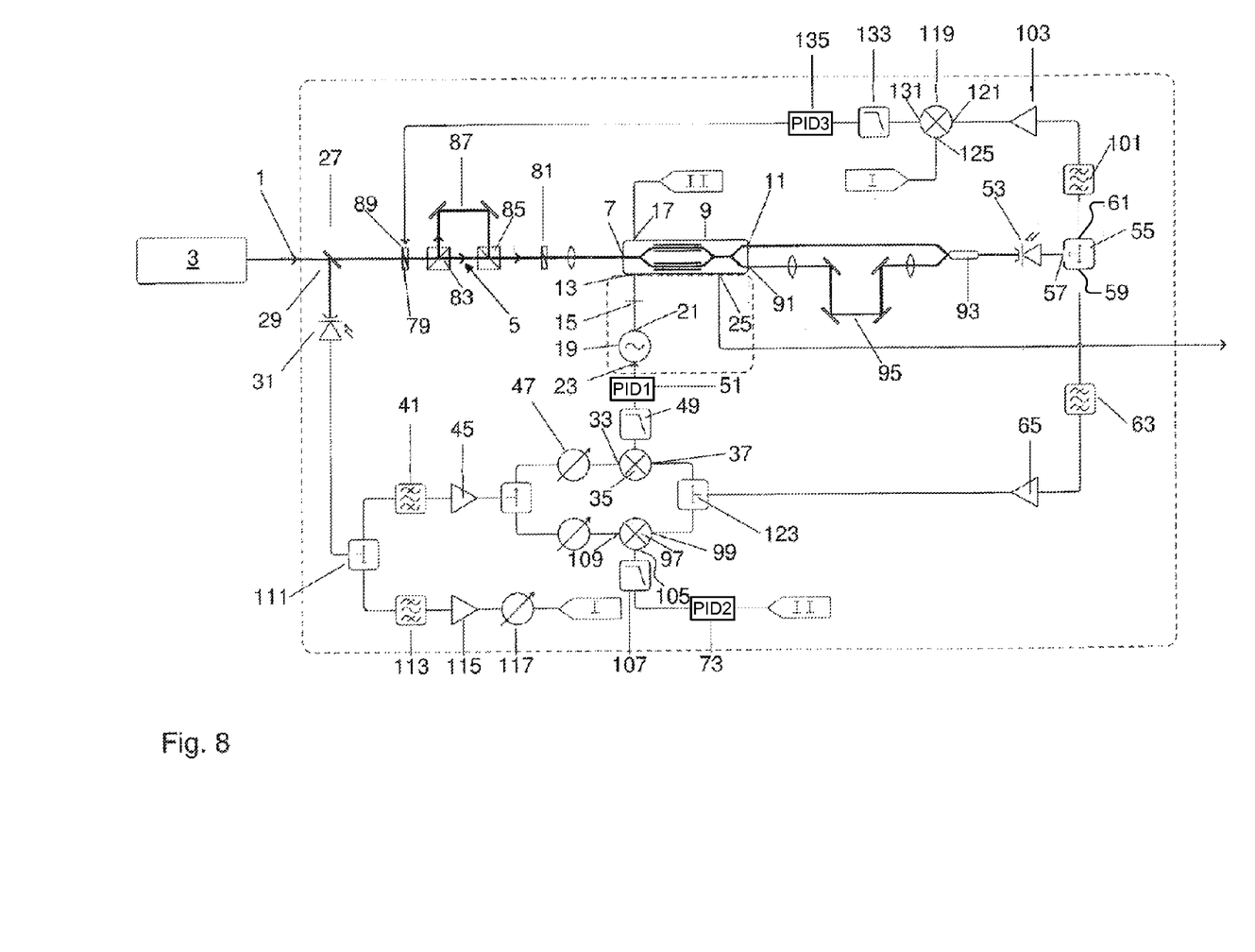
FIG. 8 shows a circuit diagram of a radio-frequency synchronization device according to a fourth exemplary embodiment of the present invention and FIG. 9 shows representations of the variation of the optical signals with time at the second photodetector together with the variation of the radio-frequency signal with time in the fourth exemplary embodiment of a radio-frequency synchronization device.

The fourth exemplary embodiment of a radio-frequency synchronization device according to the invention, which is shown in FIG. 8, operates in accordance with the same principle as that described in conjunction with FIG. 6, wherein here, too, a second optical delay section 95 is provided between the inverted optical output 91 of the electro-optical amplitude modulator 9 and the optical coupler 93, the length of which optical delay section in the present case is dimensioned in such a manner, however, that a pulse passing along there is delayed by half the distance in time between two pulses emitted by the reference source compared with such a pulse which passes between the optical output 11 and the coupler 93.

Figure 9:
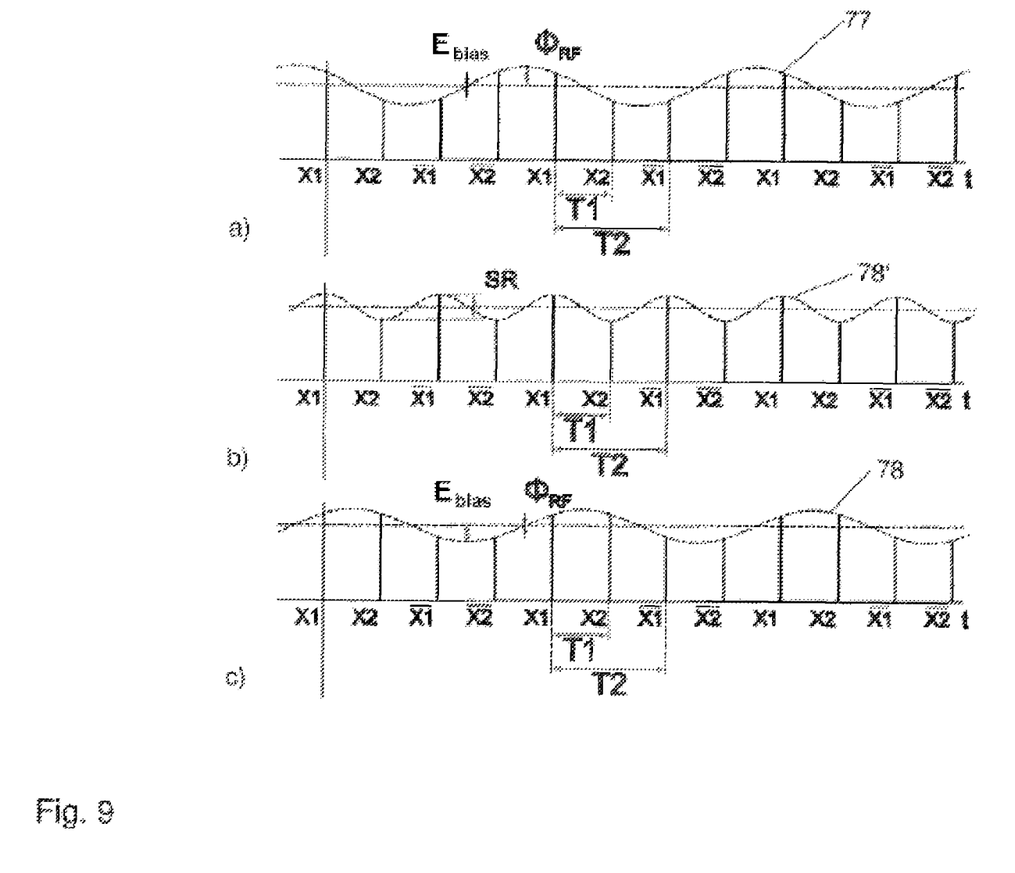

This results in the picture shown in FIG. 9 for the pulses impinging at the optical input of the second photodetector 53. Part A of FIG. 9 shows that the beat oscillation 77 which is obtained with a phase shift between reference signal and radio-frequency signal of the radio-frequency oscillator 19 has a frequency of $f_R$ and a phase shift of −45°, whereas a beat oscillation 78', which is produced due to a maladjustment of the first waveplate 79, has a frequency of $2f_R$ and a phase shift of 0° (part B in FIG. 9). Finally, it is found that in the case of a wrongly selected bias voltage at the bias voltage input 17 of the electro-optical amplitude modulator 9, a beat oscillation 78 having a frequency $f_R$ and a phase shift of +45° is obtained (part C in FIG. 9).

By a suitable choice of the sampling points and the filters, it is thus possible also in this case to discriminate between beat oscillations which are produced by wrong phase angle of the radio-frequency signal, by maladjustment of the first waveplate 79 or by a wrongly selected bias voltage at the bias voltage input 17. Analogously to FIG. 7, this makes use of the frequency, deviating from the other ones, of the one beat oscillation 78' or the phase shift of 90° between the beat oscillations 77, 78 having the same frequency. Corresponding, the waveplate mixer 119 is connected to the second output 61 of the first power divider 55 via its radio-frequency input 121, the bandpass filter 101 between them having a center frequency of $2f_R$. The local-oscillator input 125 of the waveplate mixer 119 is coupled to the first photodetector 31 via the bandpass filter 113 and the power divider 111. Besides this, both the bias voltage mixer 97 and the phase shift mixer 35 are connected with their radio-frequency inputs 37, 99 to the first output 59 of the first power divider 55 so that these two "see" the same frequency at the radio-frequency input due to the bandpass filter 63, the center frequency of which is $f_R$. The corresponding controllers 51, 73 and 135 can then control the bias voltage and the position of the first waveplate 89 again correspondingly.

As can be seen from the description of the exemplary embodiments, the system according to the invention provides a system of simple structure and a simple method, respectively, which reliably detect the phase angle of the radio-frequency signal relative to the pulses of the optical signal and provide a corresponding control signal by means of which the phase angle can be corrected. In addition, it is provided for correcting automatically maladjustments which can also result during the operation of the system.

What is claimed is:

1. A system for generating a synchronization control signal for synchronizing a radio-frequency signal having a frequency $f_{Rf}$ and a pulsed optical signal, the system comprising:
a radio-frequency signal input for the radio-frequency signal;
an input for the pulsed optical signal, the pulsed optical signal being pulsed at a repetition rate $f_R$;

an electro-optical amplitude modulator that includes an optical input, a voltage input that is connected to a phase element of the electro-optical amplitude modulator, and an optical output;
a phase shift controller that includes a controller input and a controller output at which the synchronization control signal is output;
a phase shift mixer that includes a radio-frequency input, a local-oscillator input, and an output;
a first and a second photodetector that each include an optical input and an output;
an optical input connection that connects the input for the optical signal to the optical input of the electro-optical amplitude modulator; and
an input splitter that is arranged in the input connection in order to output the optical signal additionally to a branch of the input splitter,
wherein the radio-frequency signal input is connected to the voltage input of the electro-optical amplitude modulator,
wherein the branch of the input splitter is connected to the optical input of the first photodetector,
wherein the output of the first photodetector is connected to the local-oscillator input of the phase shift mixer,
wherein the optical output of the electro-optical amplitude modulator is connected to the optical input of the second photodetector
wherein the output of the second photodetector is connected to the radio-frequency input of the phase shift mixer, and
wherein the output of the phase shift mixer is connected to the controller input of the phase shift controller.

2. The system of claim 1, wherein the electro-optical amplitude modulator is a Mach-Zehnder modulator.

3. The system of claim 1, further comprising:
a first power divider including an input, a first output, and a second output; and
a bias voltage controller that includes a controller input and a controller output,
wherein the output of the second photodetector is connected to the input of the first power divider,
wherein the first output of the first power divider is connected to the radio-frequency input of the phase shift mixer,
wherein the second output of the first power divider is connected to the controller input of the bias voltage controllers, and
wherein the controller output of the bias voltage controller is connected to the bias voltage input of the electro-optical amplitude modulator.

4. The system of claim 1, further comprising:
a frequency divider that is provided between the output of the first photodetector and the local-oscillator input of the phase shift mixer.

5. The system of claim 1, further comprising:
a beam divider that includes an input, a first output, and a second output;
a beam combiner that includes a first input, a second input, and an output; and
an optical delay section,
wherein the beam divider follows the input splitter in the input connection,
wherein the first output of the beam divider is connected to the first input of the beam combiner which follows the beam divider in the input connection, and wherein the optical delay section connects the second output of the beam divider to the second input of the beam combiner.

6. The system of claim 5, wherein a length of the optical delay section is dimensioned in such a manner that the delay experienced by a part of an optical signal that emerges from the second output of the beam divider and enters into the second input of the beam combiner compared with the part of the optical signal passes from the first output of the beam divider to the first input of the beam combiner corresponds to one quarter of a distance between two pulses of the pulsed optical signal.

7. The system of claim 5, wherein a length of the optical delay section is dimensioned in such a manner that the delay experienced by a part of an optical signal that emerges from the second output of the beam divider and enters into the second input of the beam combiner, compared with the part of the optical signal that passes from the first output of the beam divider to the first input of the beam combiner corresponds to one half of a distance between two pulses of the pulsed optical signal.

8. The system of claim 5, further comprising:
a first waveplate for rotating the plane of polarization of the optical signal incident on the first waveplate,
wherein the first waveplate is arranged between the input splitter and the beam divider and the beam divider is configured as polarizing beam divider,
wherein the first waveplate includes an adjusting device that includes a control signal input for controlling adjustment of an angle of rotation of the plane of polarization, and
wherein the electro-optical amplitude modulator includes an inverted optical output, the output signal of which, with an incoming optical signal at the optical input of the electro-optical amplitude modulator, is changed by a same amount but with an opposite polarity compared to the incoming signal, as the output signal at the optical output of the electro-optical amplitude modulator;
an optical coupler that includes a first input, a second input, and an output,
wherein the output of the optical coupler is connected to the optical input of the second photodetector,
wherein the optical output of the amplitude modulator is connected to the first input of the optical coupler, and
wherein the inverted optical output of the amplitude modulator is connected to the second input of the coupler via a second optical delay section;
a waveplate mixer that includes a radio-frequency input, a local-oscillator input, and an output;
a waveplate controller that includes a controller input and a controller output that is connected to the control signal input of the adjusting device of the first waveplate; and
a bias voltage mixer that includes a radio-frequency input, a local-oscillator input, and an output,
wherein the output of the first photodetector is connected to the local-oscillator input of the bias voltage mixer and to the local-oscillator input of the waveplate mixer,
wherein the output of the second photodetector is connected to the radio-frequency input of the bias voltage mixer,
wherein the output of the bias voltage mixer is connected to the controller input of the bias voltage controller,
wherein the output of the second photodetector is connected to the radio-frequency input of the waveplate mixer, and wherein the output of the waveplate mixer is connected to the controller input of the waveplate controller.

\* \* \* \* \*